United States Patent
Toyoda

(10) Patent No.: US 7,685,496 B2
(45) Date of Patent: Mar. 23, 2010

(54) DATA TRANSMISSION METHOD AND DATA TRANSMISSION DEVICE FOR TRANSMITTING DATA THROUGH A TRANSMISSION LINE THAT IS INTEGRATED WITH A PLURALITY OF LINKS

(75) Inventor: Hidehiro Toyoda, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 10/579,047

(22) PCT Filed: Jul. 22, 2004

(86) PCT No.: PCT/JP2004/010747

§ 371 (c)(1),
(2), (4) Date: May 11, 2006

(87) PCT Pub. No.: WO2005/048520

PCT Pub. Date: May 26, 2005

(65) Prior Publication Data

US 2007/0147434 A1 Jun. 28, 2007

(30) Foreign Application Priority Data

Nov. 14, 2003 (JP) .............................. 2003-385030

(51) Int. Cl.
*H03M 13/00* (2006.01)
(52) U.S. Cl. ...................... 714/758; 714/704; 714/710; 714/700
(58) Field of Classification Search ................. 714/758, 714/775, 704, 710, 700
See application file for complete search history.

(56) References Cited

U.S. PATENT DOCUMENTS

| 6,336,192 B1 * | 1/2002 | Sakamoto et al. ........... 713/503 |
| 6,557,110 B2 * | 4/2003 | Sakamoto et al. ........... 713/503 |
| 6,704,890 B1 * | 3/2004 | Carotti et al. ............... 714/700 |

FOREIGN PATENT DOCUMENTS

| JP | 06-252891 | 9/1994 |
| JP | 11-32008 | 2/1998 |
| JP | 11-134118 | 5/1999 |
| JP | 11-341102 | 12/1999 |
| JP | 2001-127746 | 5/2001 |
| JP | 2002-118540 | 4/2002 |

OTHER PUBLICATIONS

IEEE STD 802.3ae™-2002 (Amendment to IEEE std 802.3-2002) Aug. 2002.

* cited by examiner

*Primary Examiner*—Esaw T Abraham
(74) *Attorney, Agent, or Firm*—Brundidge & Stanger, P.C.

(57) ABSTRACT

In a method for data transmission, which transmits data through a transmission line, which integrates a plurality of links into one transmission line, a first link group, which transmits information data by at least one link out of a plurality of links, a second link group, which transmits parity data generated by the information data by at least one link out of a plurality of links, which are different from the first link group, and a third link group, which generates an error check data related to an error correction from the information data or the parity data, when an error occurs in the information data or the parity data, and transmits by at least one link out of a plurality of links, which are different from the first link group and the second link group, are integrated and transmitted.

6 Claims, 8 Drawing Sheets

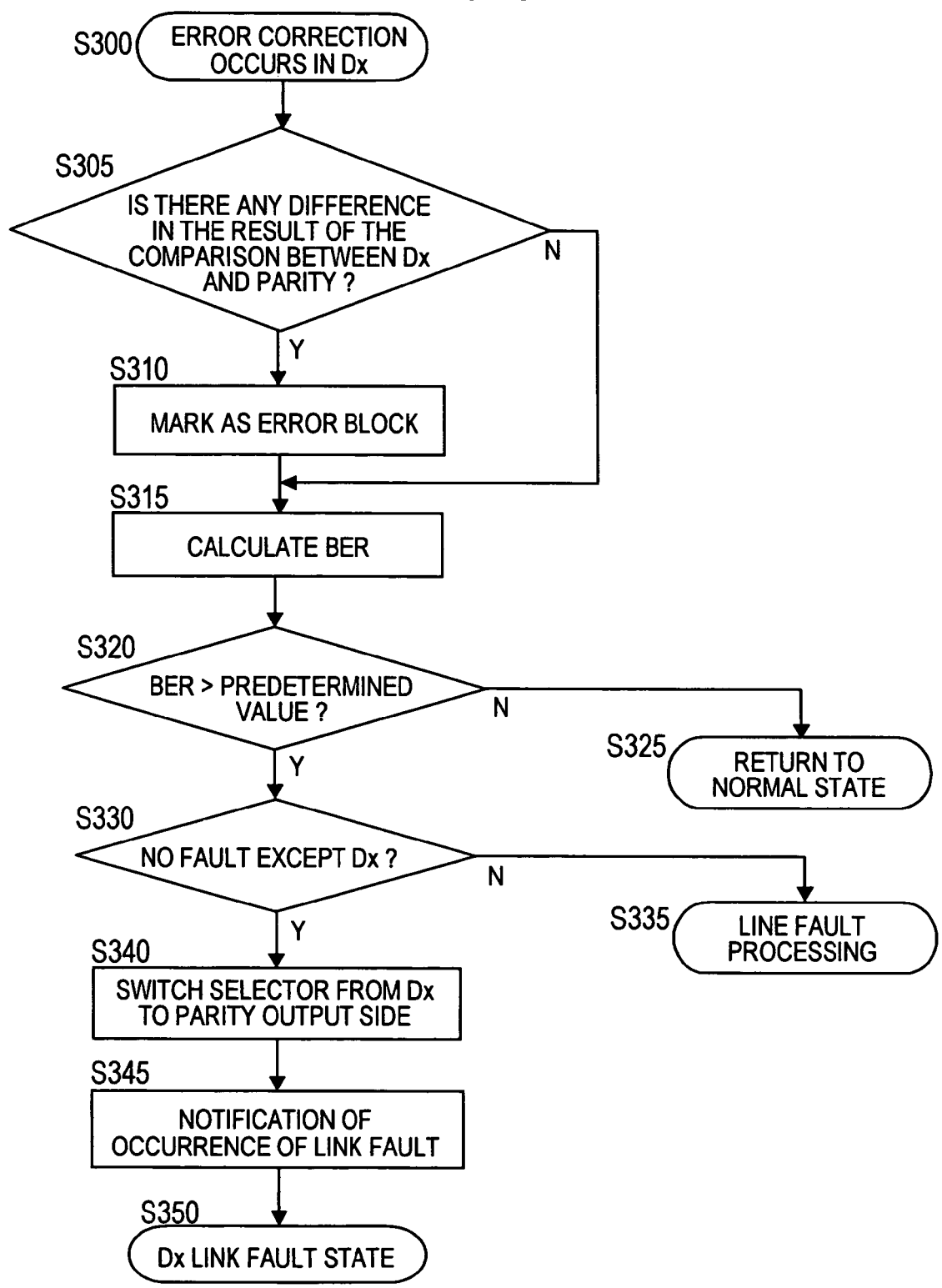

DATA TRANSMISSION METHOD AND DATA TRANSMISSION DEVICE FOR TRANSMITTING DATA THROUGH A TRANSMISSION LINE THAT IS INTEGRATED WITH A PLURALITY OF LINKS

TECHNICAL FIELD OF THE INVENTION

This invention relates to a method for data transmission on a transmission line and communication equipment (transmitting equipment and receiving equipment) for the same application.

BACKGROUND OF THE INVENTION

Regarding a method for increasing the capacity of transmission on the data transmission channel for transmitting data, the number of links (namely, number of bits) for transmitting data has been increased and a parallel synchronization data transmission method has been employed, which can increase the capacity of transmission. In the parallel synchronous data transmission method, however, it is required that the timing of each link coincides in units of bits when data arrives at the receiving side. However, as the transmission distance increases, a difference in the transmission distance is created between links to cause to generate a transmission delay and to bring about a difference of arrival time (skew) between links. In order to perform a long-distance data transmission using the parallel synchronization data transmission method, the problem of the skew has to be solved. Therefore, the conventional parallel synchronization data transmission method was not suitable for the long-distance data transmission.

On the other hand, there is a serial data transmission method using a technique, in which a parallel signal is time-multiplexed to be serialized, and after being transmitted as a serial signal, being subjected to parallel-conversion again at the receiving side (generally referred to as "SerDes" (Serializer/De-serializer)). By using the SerDes, the problem of the skew between bits can be solved. This becomes remarkable when the above-mentioned parallel data transmission is accelerated, so that the long-distance data transmission becomes possible.

With the increase of IP traffic in recent years, as higher speed is also required in the field of transmission, the capacity of a transmission of more than 100 Gbps becomes necessary. However, in order to have a further broader bandwidth in the serial data transmission method, it is necessary to increase the density along the time direction by reducing the pulse width of one bit, since there is a physical limit, it was not possible to increase the bandwidth very much. This is why using both a parallel processing technique and a high-speed technique for serial signal is important.

Then, in order to transmit high-speed serial data by further performing a parallel-conversion, it is necessary to solve the skew, which became a problem in the parallel synchronization data transmission method. However, if it is assumed that each serial signal becomes a high-speed signal of 10 Gbps, the pulse width of one bit becomes 100 ps and it is eventually impossible to transmit it by synchronizing in units of bits. Therefore, a method is considered in which a serial signal is divided into blocks having a certain width to perform a synchronization transmission in units of blocks. Non-patent document 1 discloses (IEEE Std 802.3ae-2002 Edition, "Media Access Control (MAC) Parameters, Physical Layers, and Management Parameters for 10 Gb/s Operation") in the XAUI (10 Gigabit Attachment Unit Interface), a method is employed, which utilizes an 8B/10B encoding method, performing a correction of the skew in units of this code.

On the other hand, in order to perform a long-distance data transmission by a parallel-conversion of a high-speed serial signal, it is possible to utilize a WDM (Wavelength Division Muitiplex) transmission method to transmit data by allocating each serial signal to a different wavelength. However, the WDM has a problem in which a cross talk with an adjacent wavelength becomes large, so that the error rate (BER: Bit Error Rate) of the line becomes large in order to lower the bandwidth. When the distance is comparatively short, it is possible to perform a parallel transmission by each fiber by bundling a plurality of fiber and using a ribbon fiber, however, since an optical fiber for use is a MMF (Multi-Mode Fiber), a long-distance transmission causes a large signal degradation to increase the BER. Further, since in the optical transmission, a plurality of laser oscillators and receivers are mounted on a one module, and at the same time, there is a plurality of optical link paths (frequency of parallelism), a failure rate of the entire system at least increases the times of the frequency of parallelism, when compared with a single laser oscillator. Moreover, there is a problem that when any one of a plurality of lines comprising the channel fails, the line immediately breaks down.

Accordingly, in the patent document 1 (JP 11-32008A), the optical transmitting equipment is disclosed, which transmits redundant bits for performing an error correction using another path in addition to a path for transmitting a data signal in order to improve the reliability of the transmission line and at the same time not to accelerate the transmission speed.

In the patent document 2 (JP 2002-118540A), a method for an optical transmission is disclosed, in which information data is transmitted by using a plurality of channels, and at the same time, a check data for the information data is transmitted by using another channel, and on the receiving side, an error correction for each channel is conducted by the check data, and the check data can be transmitted and the error correction can be performed without increasing the transmission speed of the channel for transmitting the information data.

DISCLOSURE OF THE INVENTION

In a transmission line for converting high-speed serial data into parallel data and transmitting it, the BER increases when performing a long-distance transmission. Further, since a plurality of laser oscillators are mounted on a one module, and there are a plurality of optical link paths (frequency of parallelism), a failure rate of the entire system at least increases the times of the frequency of parallelism when compared with a single laser oscillator. In the parallel transmission, there is a problem that when any one of a plurality of lines fails, the line immediately breaks down.

Moreover, there were problems that in the patent document 1, a method for transmitting a digital signal by serial method is disclosed, however, nothing is disclosed for the parallel method, and in the patent document 2, since the transmitted check data is employed for an error control (error correction), it is not possible to compensate for the state, where one channel is missing among a plurality of channels, which transmit information data.

This invention is conducted in view of these problems and its purpose is to provide a method for data transmission and equipment for the same reason, in which a line fault is avoidable in the long-distance transmission using a parallel data transmission.

In the transmitting equipment according to this invention, it is characterized in that a stream of data (hereinafter, original data) to be transmitted is subjected to data division according to the number of links, and the original data, which is subjected to data division, is transmitted by using a plurality of links (hereinafter, data link). Further, a parity (hereinafter, parity data) of each data link is calculated and transmitted by using a different link (hereinafter, parity link) from the data link. Furthermore, in the data link and parity link, an error check bit for transmitting data is calculated and both are transmitted. The receiving equipment, according to this invention, receives the original data containing a bit error created during transmission, parity data and check bit. The receiving equipment calculates the error of the received original data and parity data by using the corresponding check bit and when detecting the error, the data is corrected. If there is no error at the receiving side, the data received from the data link is judged to be the right data, which is not different from the transmitted original data, being adopted as the received data. The characteristics of this invention is that in each link, a parity is always calculated, which is obtained from the original data received from the data link other than the self-link and parity link, and parity data, and the original data is restored.

Further more, the characteristics of this invention are furthered when an error correction occurs in the receiving equipment, the number of corrections is counted and BER of the link is calculated. Furthermore, a reliable minimum BER of the link is predetermined. When the calculated BER of the link becomes larger than the minimum BER, the link is judged to be unreliable, and the restored original data is adopted as the received data.

BRIEF DESCRIPTION OF THE DRAWINGS

FIG. 9 is a flow chart illustrating a procedure when an error correction occurs in each data link according to the embodiment of this invention.

DESCRIPTION OF THE PREFERRED EMBODIMENTS

In the following, embodiments of this invention will be illustrated in detail based on drawings. However, this invention is not limited thereto.

Figure 1:
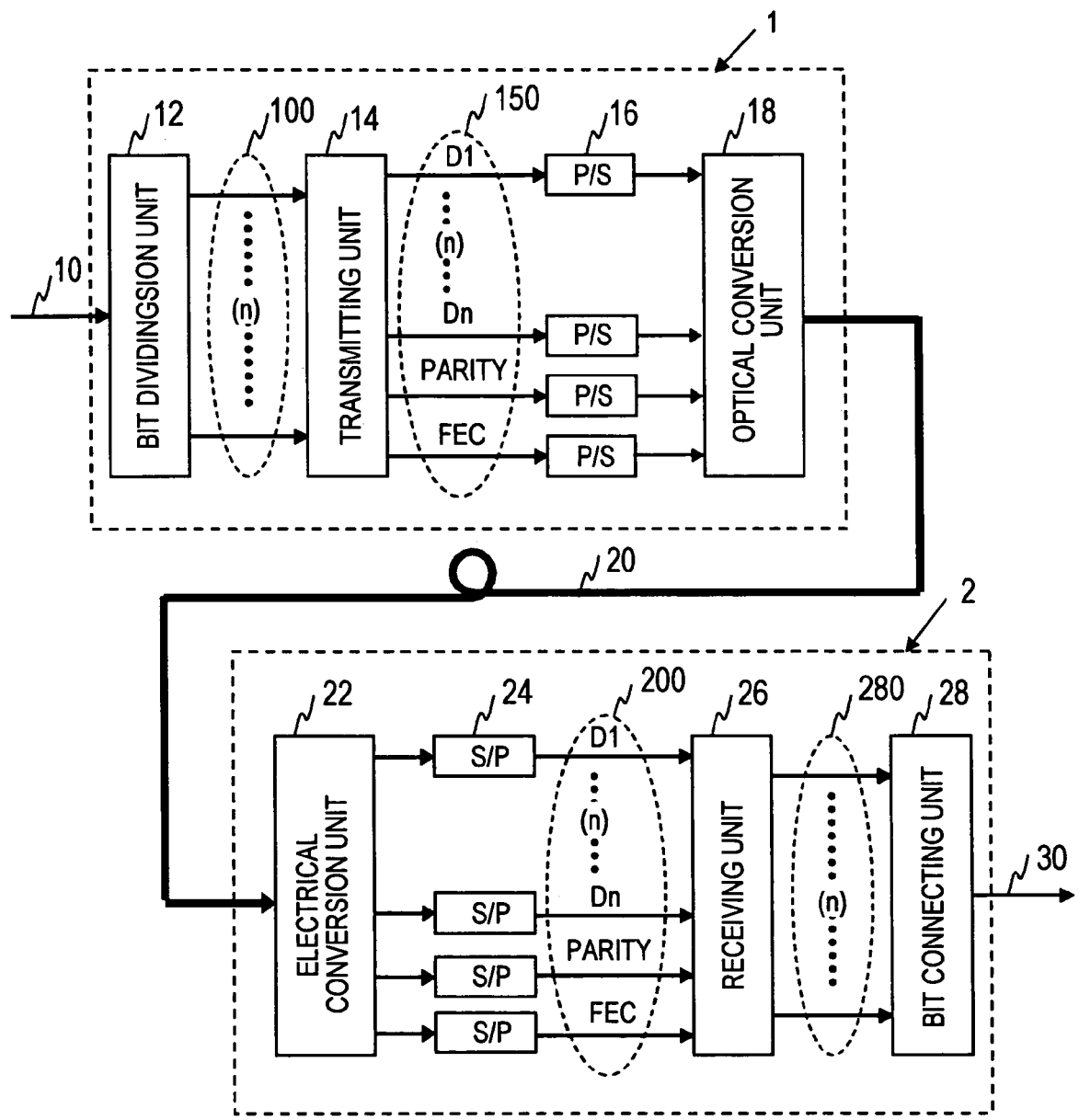
FIG. 1 is a block diagram illustrating an entire transmission system according to the embodiment of this invention.

FIG. 1 is a block diagram illustrating the entire transmission system according to the embodiment of this invention.

The transmission system according to the embodiment of this invention is configured in such a way that the transmitting equipment 1 and the receiving equipment 2 are connected through the transmission line 20, and the transmitting equipment 1 transmits signal (data) through the transmission line 20, and the receiving equipment 2 receives it.

The transmitting equipment 1 is equipped with an input terminal 10, bit division unit 12, a plurality of data links 100, receiving unit 14, a plurality of links 150, a plurality of P/S conversion units 16, and optical conversion unit 18. The receiving equipment 2 is equipped with an electrical conversion unit 22, a plurality of S/P conversion units 24, a plurality of links 200, receiving unit 26, a plurality of data links 280, bit connecting unit 28, and output terminal 30. The transmission line 20 is composed of an optical fiber and the like, and a plurality of links is configured on a transmission by a ribbon fiber, which is composed of a plurality of optical fibers, or WDM technique.

Data input from the input terminal of the transmitting equipment 1 is divided into n (n is a natural number) data links 100 at the bit division unit 12. In the following, each division unit of the data links 100 is referred to as D1-Dn, respectively. The divided data links are inputted into the transmitting unit 14. The transmitting unit 14 obtains the parity link (redundant link) and check link from the input data links D1-Dn to output a link 150 to the P/S conversion unit 16, which are D1-Dn links and two links (n+2, in total). In addition, for the check link, for example, an FEC (Forward Error Correction) is employed. The P/S conversion unit 16 converts these n+2 links 150 from low-speed parallel data to a high-speed serial data, respectively, to output to the optical conversion unit 18. In the optical conversion unit 18, each serial data output from the P/S conversion unit 16 is converted from the electronic signal to the optical signal and the converted optical signal being transmitted to the transmission line 20.

In addition, the form of data (the form of data of each output link at the transmitting unit 14) of each link can be a serial data, and in that case, the P/S conversion unit 16 is not necessary.

When employing the WDM for the transmission line 20, the optical conversion unit 18 allocates the obtained optical signal to a plurality of wavelengths respectively and transmits it to the transmission line 20. When the transmission line 20 is composed of a ribbon fiber, each optical signal is transmitted for each fiber, and no particular wavelength conversion is required.

N+2 optical signals, which the transmitting equipment 1 transmitted, are sent to the receiving equipment 2 through the transmission line 20. The receiving equipment 2, at first, receives n+2 optical signals after the optical transmission through the electrical conversion unit 22, transforms the received optical signals to electrical signals, and outputs to the S/P conversion unit 24. The converted electrical signal is converted from a high-speed serial data to a low-speed parallel data in the S/P conversion unit 24. The S/P conversion unit 24 outputs the links 200 (including data link D1-Dn, parity link, and check links, n+2), which are converted from serial data, into the receiving unit 26.

The receiving unit 26 obtains data links (D1-Dn) from the input link 200, which are error-corrected by the parity link and check link, and outputs the data links 280 to the bit connecting unit. The bit connecting unit 28 connects bits of the data of the data link 280 and outputs them from the output terminal 30.

According to the above-mentioned configuration, the data input to the transmitting equipment 1 is transmitted to the receiving equipment 2. The data output from the output terminal 30 of the receiving equipment 2 has quite the same content with the data input from the input terminal 10 of the transmitting equipment 1.

Figure 2:
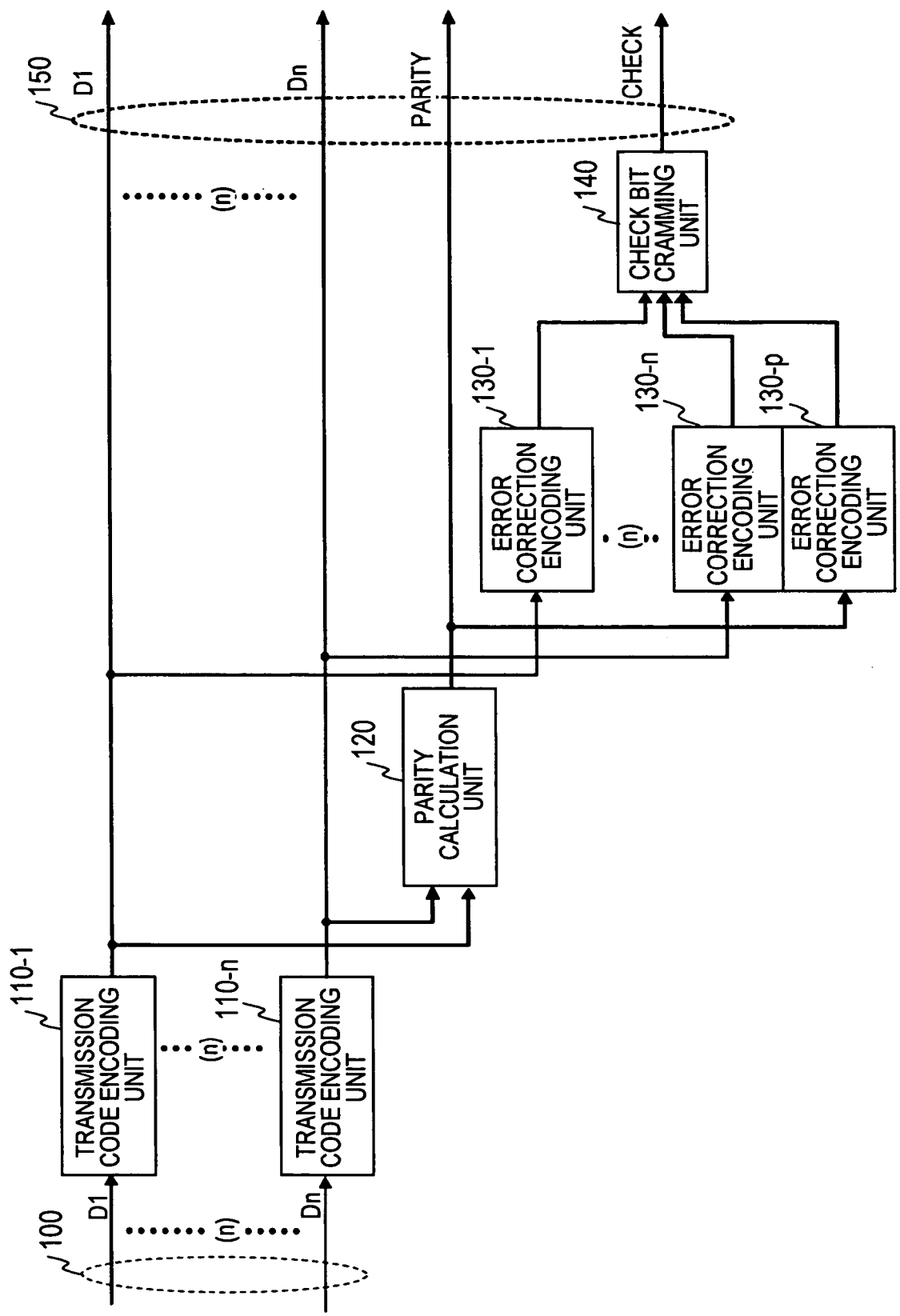
FIG. 2 is a block diagram illustrating the internal configuration of the transmitting unit according to the embodiment of this invention.

FIG. 2 is a block diagram illustrating the internal configuration of the transmitting unit 14 according to the embodiment of this invention.

The transmitting unit 14 is composed of n (n is a natural number) data links 100, n encoding units (110-1 through 110-n), parity calculation unit 120, n+1 error correction encoding units (130-1 through 130-n, 130-p), check bit cramming unit 140, and n+2 links 150 and the like.

The data links 100 input to the transmitting unit 14 are input to the encoding units 110-1 through 110-n, respectively. The encoding units 110-1 through 110-n divide the data stream input from the data link 100 into blocks of a predetermined size and convert the divided blocks into a transmission code. In the present embodiment, 64B/66B code is employed as a transmission code. However, the transmission code method is not limited to the above. The encoding units 110-1 through 110-n divide the input data stream into blocks in units of sixty-four bits by using the 64B/66B code, and converts the divided blocks into transmission codes, which are composed of sixty-six bits (header two bits, data sixty-four bits). That is, the data streams D1-Dn are converted respectively to D1 link (corresponding to the data stream D1)-Dn link (corresponding to data stream Dn), which comprises the link 150.

The parity calculation unit 120 receives the data streams D1-Dn output from the coding units 110-1 through 110-n and calculates the parity of the received data stream. The calculated parity data stream is output as a parity link comprising the link 150.

Figure 3:
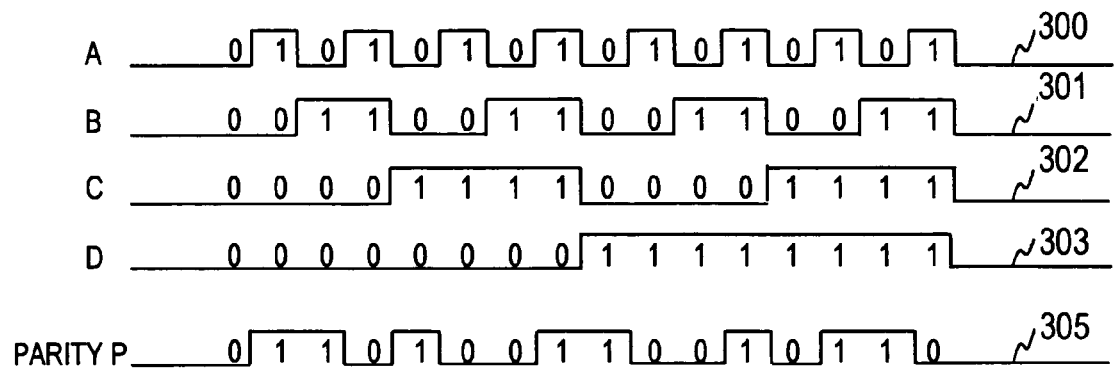
FIG. 3 is a schematic diagram typically illustrating an example of method for calculation of parity according to the embodiment of this invention.

Here, explanations will be given to the parity. FIG. 3 is a schematic diagram typically illustrating an example of the method for calculating parity.

When four data streams, A300, B301, C302 and D303, are input, an Exclusive-Or is calculated for the bit of all data streams.

The value is called a parity. The parity shown in FIG. 3 is generally called an even parity. Additionally, in this case, the parity P305 corresponding to the four inputs can be obtained by the following equation (1).

$$P = A \oplus B \oplus C \oplus D \quad (1)$$

By using the parity, even if one data stream out of four is lost, the lost data stream can be retrieved by the remaining three data streams and the parity.

Figure 4:
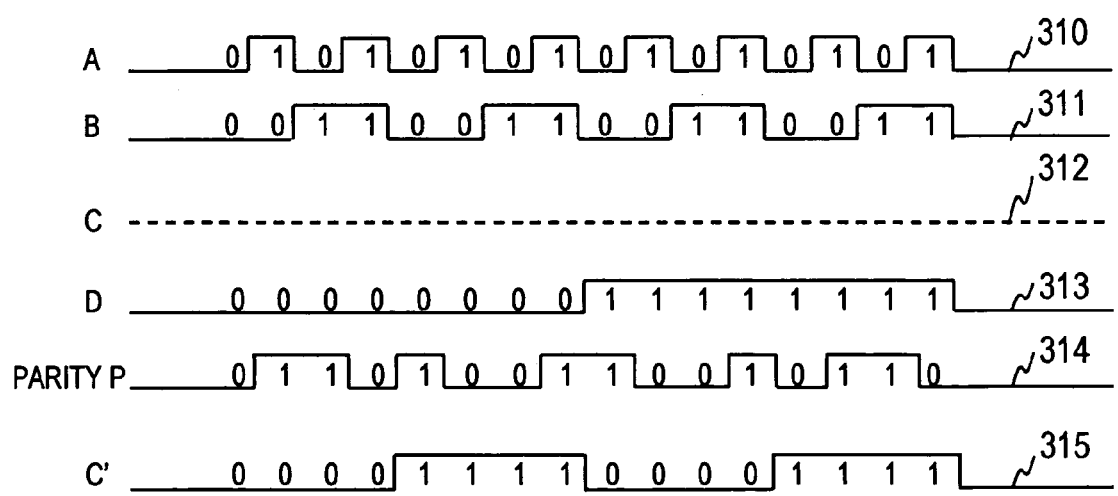
FIG. 4 is a schematic diagram illustrating an example of a restoration of a data stream from a parity data stream according to the embodiment of this invention.

FIG. 4 is a schematic diagram illustrating an example of the case when one data stream is lost out of four. When the data stream C312 is lost and four data-streams of the remaining three data streams (data stream A310, B311 and D313) and parity data stream 314 are normally transmitted, the calculation of the Exclusive-OR of the four data streams in units of bits creates the output of the lost original data stream C'315, for which the parity stream is calculated. Its value is equal to the above-mentioned data stream C302, so that the lost data can be retrieved. Obtained C' is equal to the input data stream C. Further, the data restoration by the three data streams and the parity is obtained by the following equation (2).

$$A \oplus B \oplus D \oplus \oplus P = C' \quad (2)$$

Back to the explanation of FIG. 2. The error correction encoding unit (130-1 through 130-n and 130-p) calculates the check bit of the error correction code from data streams D1-Dn and parity data stream, respectively, and outputs it into the check bit cramming unit 140.

As for the error correction code, a Hamming code, BCH (Bose Chaudhuri Hocquenghem) code, Reed-Solomon code and the like are generally known. In the embodiment of this invention, an example is illustrated, in which the Hamming code of m=7 is employed, where code length: 2m−1=127 bits, information bit: 2m−m−1=120 bits, check bit: m=7 bits, and error correction of one bit out of 127 bits is possible.

The Hamming code gives a check bit of a predetermined length against an information bit of a constant length. As mentioned before, since the 64B/66B code is employed for a transmission code, the information bit assigned to one code becomes 66 bits. The information bit of the cyclic Hamming Code (m=7) is 120 bits, however, only 66 bits are actually used and the value of the remaining 54 bits is set at "0". From the information bit and a generating polynomial G (1+x3+x7) of the commonly known cyclic Hamming code (m=7), the check bit of 7 bits is calculated. Further, in this invention, the method for the error correction encoding for use is not limited to the above.

The check bit cramming unit 140 receives the data links D1-Dn and the check bit of the parity link, which are output from the error correction encoding unit 130-1 through 130-n, 130-p, and performs a cramming operation of the received check bit into the data part of the 64B/66B code block, which is simultaneously output with the corresponding data. The data stream of the crammed check bit is output as a check link comprising the link 150.

Figure 5:
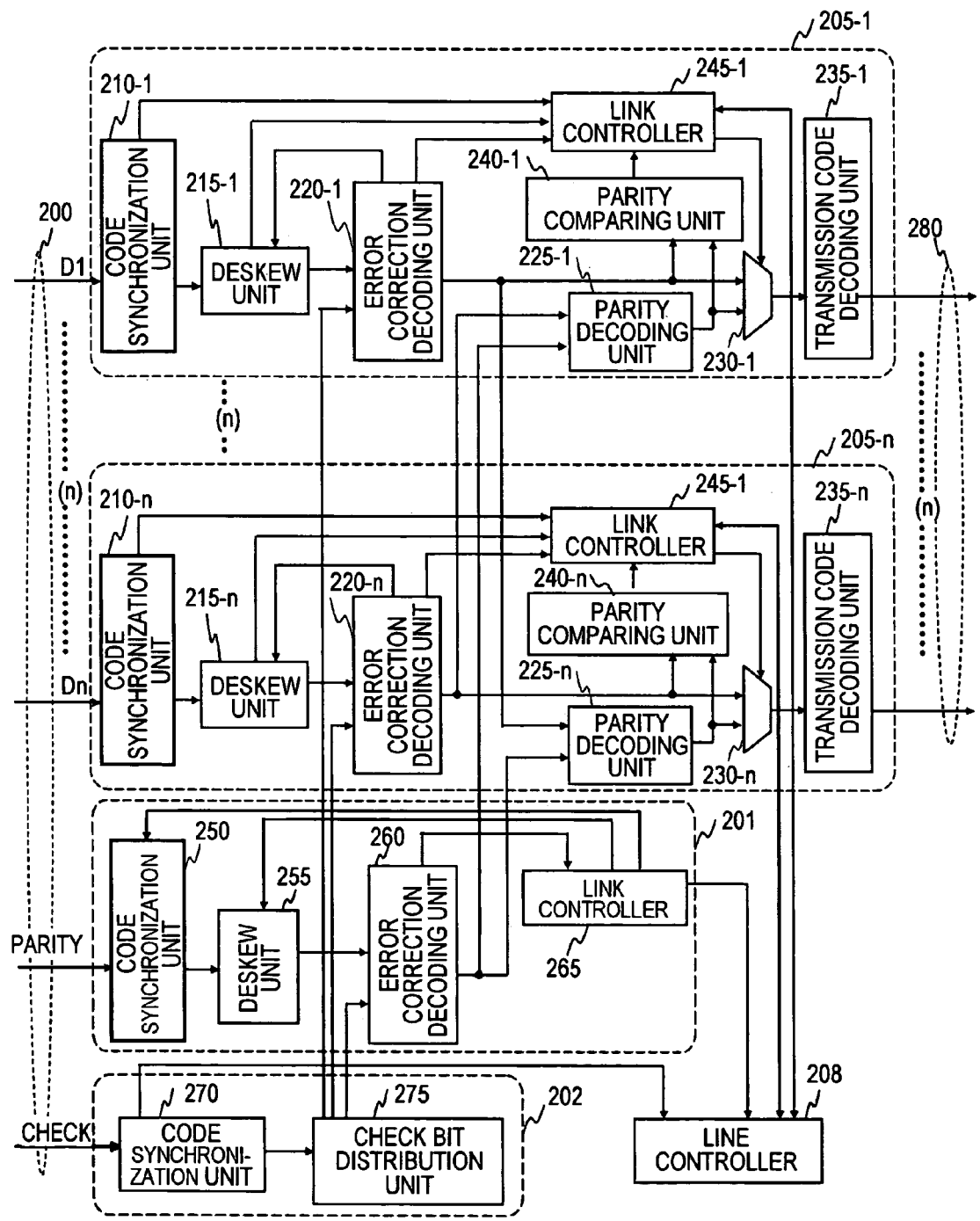
FIG. 5 is a block diagram illustrating the internal configuration of the receiving unit according to the embodiment of this invention.

FIG. 5 is a block diagram illustrating the internal configuration of the receiving unit 26 according to the embodiment of this invention.

The receiving unit 26 is composed of the link 200, a plurality of data link corresponding units (205-1 through 205-n) corresponding to each link of link 200, parity link corresponding unit 201, check link corresponding unit 202, line controller 208, data link 280 and so on.

To the check link corresponding unit 202, the check link comprising the link 200 is input. The check link corresponding unit 202 is composed of a code synchronization unit 270 and check bit distribution unit 275. The code synchronization unit 270 detects, at first, the header of the 64B/66B code from the input data stream, and based on the header, detects the data stream to perform the code synchronization operation. The result of the synchronization is informed to the line controller 208. The check bit distribution unit 275 extracts the check bit of the Hamming code, which is embedded with the transmitting unit 14 from the data area of the 64B/66B code block, and distributes the extracted check bit to the data link corresponding unit 205, which processes the corresponding data links D1-Dn, and the parity link corresponding unit 201, which processes the parity link.

To the parity link corresponding unit 201, the parity link comprising the link 200 is input. The parity link corresponding unit 201 is composed of a code synchronization unit 250, deskew unit 255, error correction decoding unit 260, and link controller 265. The code synchronization unit 250 performs synchronization at a synchronous location, which is specified by the link controller 265 to inform the link controller 265 of the result. The deskew unit (skew compensation unit) 255 performs correction of the difference of the arrival time (skew) between the data stream of the self link and that of the check link. This processing is called deskew. The link controller 265 specifies the quantity of the skew compensation for the difference of the arrival time. The error correction decoding unit 260 receives the data stream of the parity link the check bit and the check bit distribution unit 275 and performs the error correction decoding processing. When detecting a bit error in a data stream by the check bit, an error correction is performed, and at the same time, notified to the link controller 265. The data stream of the parity link is a value subjected to the Exclusive-OR of the data stream of each data link, and the header information of the 64B/66B code is also a result of the calculation of the Exclusive-OR, so that it cannot be detected. Then, the link controller 265 adjusts a synchronous location and skew compensation quantity based on the result of the correction of the error correction decoding unit 260. That is, the location where the correction conducted by the error correction decoding unit 260 does not continuously happen is the synchronous location and at the same time, a correct skew compensation quantity. After the code synchronization and deskew processing are completed, the link controller 265 notifies the line controller 208 of the result.

To the data link corresponding units (205-1 through 205-n), the data links D1-Dn comprising the link 200 are input, respectively. As for the data link corresponding units 205-1 through 205-n, since only input data links are different and the internal configuration is the same, separate explanations will be omitted. In the following, explanations will be given to the data link corresponding unit 205-1.

The data link corresponding unit is composed of a code synchronization unit 210-1, deskew unit 215-1, error correction decoding unit 220-1, parity decoding unit 225-1, selector 230-1, decoding unit 235-1, comparison unit 240-1, and link controller 245-1. The code synchronization unit 210-1 detects the header of the 64B/66B code from the input data stream and based on the header, performs the code synchronization processing. The code synchronization unit 210-1 notifies the link controller 245-1 of the result of the synchronization. The deskew unit (skew compensation unit) 215-1 performs a processing to correct the difference (skew) of the arrival time between the data stream of the self link and that of the check link. The deskew unit 215-1 receives the error correction information output from the later error correction decoding unit 220-1, and adjusts the internal delay quantity, that is, the skew compensation quantity not to generate a continuous error correction. The error correction decoding unit 220-1 receives the data stream from the deskew unit 215-1 and the check bit from the check bit distribution unit 275 to perform the error correction decoding processing. When detecting a bit error by means of the check bit, the error correction is performed, and at the same time, the error correction is notified to the link controller 245-1 and deskew unit 215-1. The data stream, which is subjected to the error correction output from the error correction decoding unit 220 is output to the selector 230-1 of the self link and to the parity decoding units 225-2 through 225-n independently from the self link (for example, data links D2-Dn). The parity decoding unit 225-1 receives the data stream of the data link independently from the self link, which is subjected to the error correction processing and the data stream of the parity link and calculates the Exclusive-OR in units of bits to output it to the selector 230-1. The selector 230-1 selects either of the outputs from the error correction decoding unit 220 or that of the parity decoding unit 225-1 according to the instruction of the link controller 245-1 to output to the decoding unit 235. Under a condition of no fault of the link (such as a break of the link), the data stream output from the error correction decoding unit 220-1 and that from the parity decoding unit 225-1 becomes equal. The comparison unit 240-1 compares the data stream output from the error correction decoding unit 220-1 with that from the parity decoding unit 225-1 to notify the link controller 245-1 of the result of the comparison. The link controller 245-1 usually selects the data stream output from the error correction decoding unit 220-1, however, when judging that a fault occurs in the self link, it instructs the selector 230-1 to select the data stream output from the parity decoding unit 225-1.

Finally, the decoding unit 235-1 performs the 64B/66B decoding processing against the data stream output from the selector 230-1 to output to the data link 280. The output of the data link 280 becomes equal to the data stream of the data link 100 input to the transmitting unit 14.

According to the series of operations, data is transmitted from the transmitting equipment 1 to the receiving equipment 2, and when an error occurs in one of the data links, the link can be corrected by the parity link. Additionally, in the embodiment of this invention, one parity link is employed, however, a plurality of parity links can be employed. By using a plurality of parity links, the error correction can be performed with a higher precision.

With regard to the embodiment of this invention, which is configured like the above, explanations will be given while referring to the flow chart.

Figure 6:
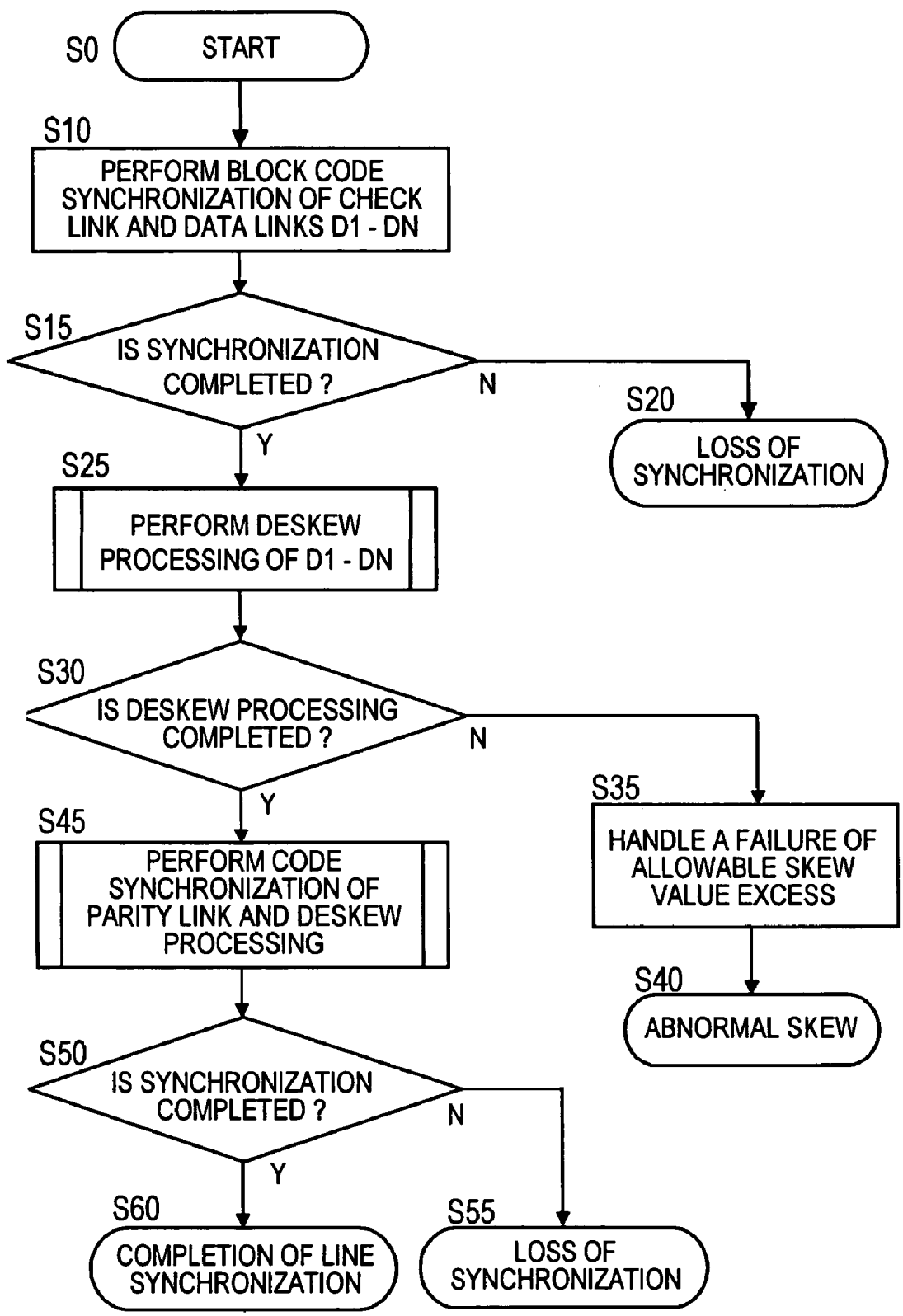
FIG. 6 is a flow chart illustrating a code synchronization processing of each link according to the embodiment of this invention.

FIG. 6 is a flow chart illustrating the code synchronization processing of each link, which the line controller 208 of the receiving unit 26 performs.

From S0 the processing resumes. And the synchronization processing of the data links D1-Dn and the check link is performed in the code synchronization units (210-1 through n and 270) of each link corresponding unit (S10). Then, it is judged whether the synchronization of the link is established (S 15). When it is judged that the synchronization of the link is established, the processing goes to S 25. When it is judged that the synchronization of the link is not established, the processing advances to S20 to lose synchronization. In the case of the loss of synchronization, the code synchronization processing is redone from S0.

On the other hand, in S25, the deskew processing is conducted in the deskew units (215-1 through 215-n) of the data links D1-Dn. Details of the deskew processing will be given later in FIG. 7. Then, it is judged whether the deskew processing is completed or not (S30). When it is decided that the deskew processing is not completed, it is judged that the substantial skew quantity is more than the assumed allowable value of the skew, a fault notice is issued that the skew quantity exceeds an allowable value (which means that the line cannot establish the synchronization) (S35) and the line synchronization processing is discontinued (S40).

On the other hand, when it is judged that the deskew processing is completed, the code synchronization and deskew processing of the parity link are performed (S45). Details of the code synchronization and deskew processing of the parity link will be described later in FIG. 8. Next, it judges whether the code synchronization processing is completed or not (S50). When it is judged that the code synchronization is not completed, an out-of-synchronization occurs (S55). When synchronization is lost, it usually advances to S45 or S0 to repeat the processing. On the other hand, when it is judged that the code synchronization processing of the parity link is completed, the code synchronization and deskew processing of all the links is completed and the synchronization of the line is completed (S60).

Figure 7:
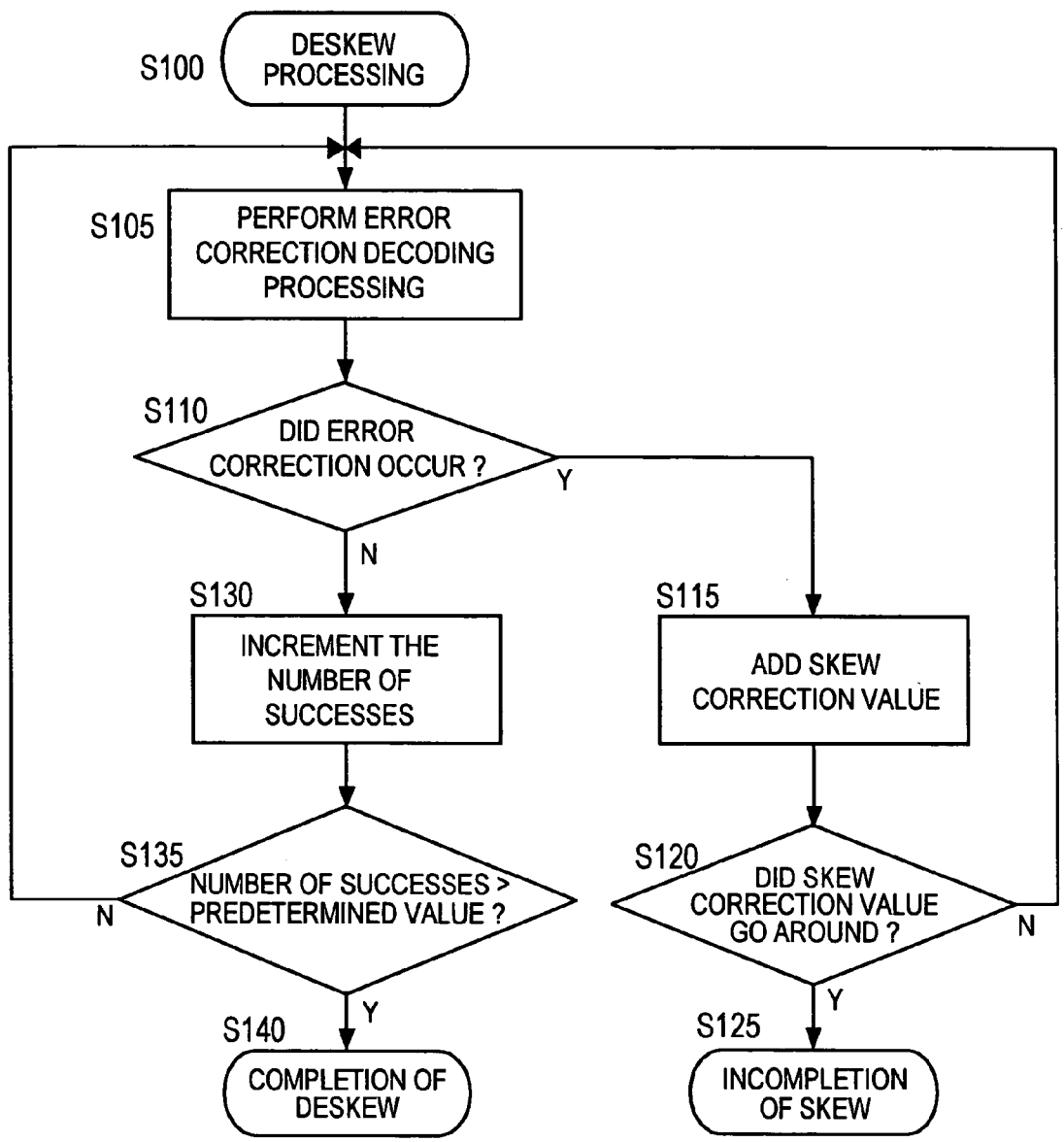
FIG. 7 is a chart illustrating details of a deskew processing according to the embodiment of this invention.

FIG. 7 is a flow chart illustrating details of the deskew processing (S25 in FIG. 6), which the data link corresponding unit 205 performs.

From S100, the processing starts. Firstly, in the error correction decoding unit 220 corresponding to each link (D1-Dn), the error correction decoding processing is performed from the data link and check bit. (S105). Next, in the error correction decoding processing, it is judged whether an error occurs and the error correction is performed or not (S110).

When it is judged that an error correction has occurred, the processing goes to S115 to increase (or decrease) the skew compensation quantity by a predetermined quantity (for example, "1"), which is an internal configuration of the deskew unit 215. Then, it is judged whether the skew compensation value exceeds a predetermined constant quantity or not (S120). When it does not exceed, the processing from S105 is repeated again. When the skew value exceeds the constant value, that is, error occurs under any skew compensation quantity, it is estimated that the actual skew quantity is larger than the allowable value of the assumed skew compensation quantity, so that the processing terminates with the deskew being uncompleted (S125). The correction quantity of the skew, that is the timing lag of each link, cannot realistically be changed only for a certain constant quantity (which is dependent on mounting). Because of this, when the quality of the transmission line and delay is remarkably different among each link, deskew cannot be performed, therefore, after S125, the error notification and the like is performed. The skew compensation quantity temporarily stores data in an internal buffer in the deskew unit 215, moves back (or forward) the timing of the data, for example, in units of several milliseconds, and performs the synchronization of the timing of each data stream. When moving the timing, a predetermined quantity must be configured because too much movement causes interference with the timing of other data streams.

On the other hand, when the error correction does not occur, it is judged that the deskew is successful and the number of successes is counted up (S130). Next, it is judged whether the number of successes exceeds a predetermined value (for example, five times) (S135). When the number of successes is smaller than the predetermined value, the processing returns to S105 and is repeated. When the number of successes exceeds the predetermined value, it is judged that the deskew processing is completed (S 140) and the processing returns to those of in FIG. 6.

Additionally, in S10, the judgment was made by whether the error correction occurred or not, however, it is allowable that by calculating an error rate, the judgment can be made whether the error rate exceeds a predetermined value or not. For example, when the error rate is equal to or less than the predetermined value, it is judged that the deskew is successful.

Figure 8:
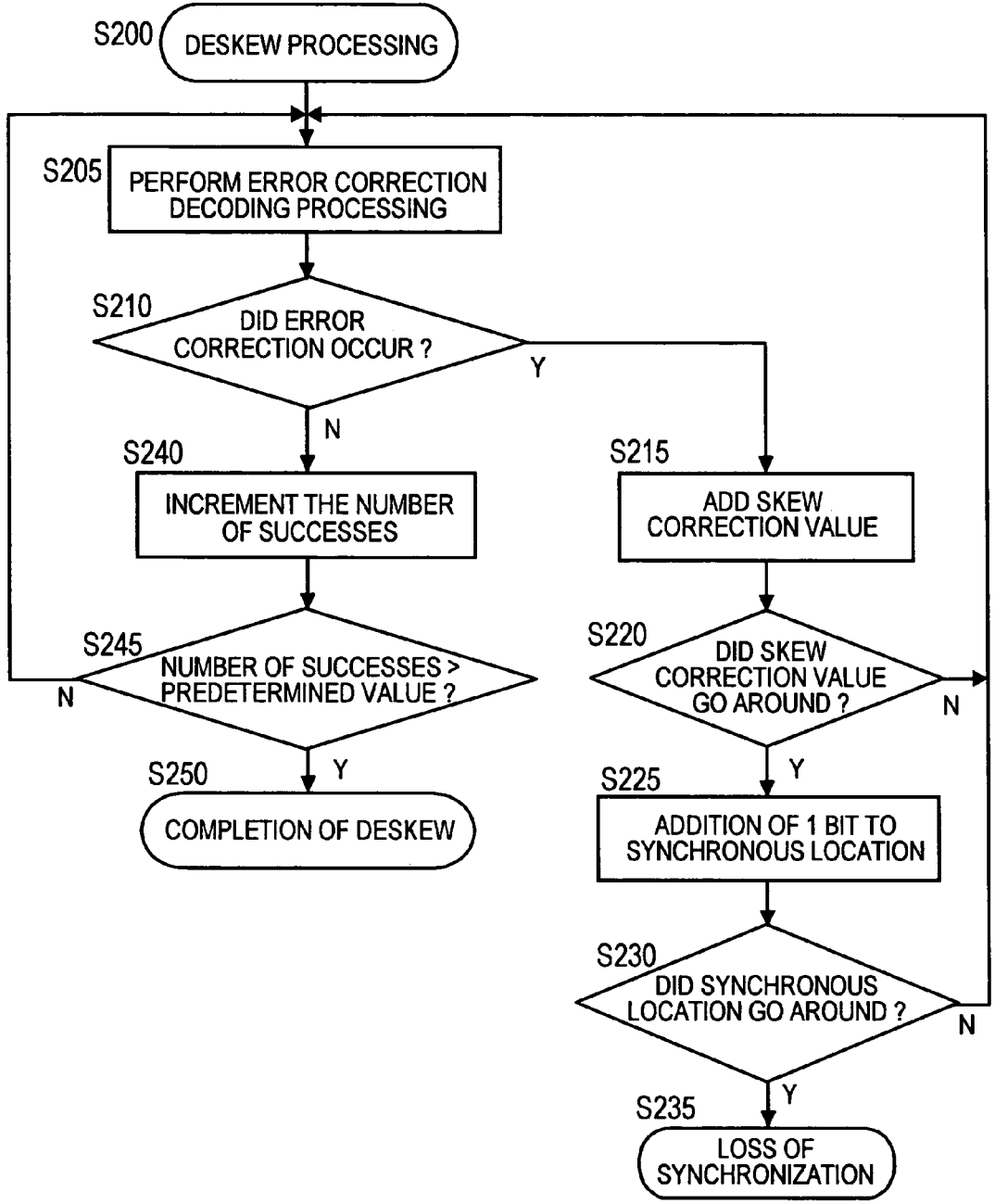
FIG. 8 is a flow chart illustrating details of the parity code synchronization and deskew processing according to the embodiment of this invention.

FIG. 8 is a flow chart illustrating the details of the parity code synchronization and deskew processing (S45 in FIG. 6) in the parity link corresponding unit 201.

Firstly, the processing starts from S200. In the error correction decoding unit 260, the error correction decoding processing is performed (S205). Next, in the error correction decoding processing, it is judged whether an error occurs, and the error correction is made or not (S210).

When it is judged that the error correction occurs, the skew compensation quantity, which is an internal configuration of the deskew unit 215, is made to increase (or decrease) by a predetermined value (for example, "1"). Then, it is judged whether the skew compensation quantity exceeds a predetermined constant quantity or not (S220). When it does not exceed the quantity, the processing is repeated from S205. When the skew value exceeds the constant quantity, the code synchronous location is shifted by one bit (S225). And it is judged whether the shifted code synchronous location tried and tested all synchronous locations in a predetermined area (S230). Since, as long as no data error occurs in each data link, no error occurs when all bits are synchronized, so that trial and test are performed by delaying the synchronization of parity by one bit. When the error correction occurs at every synchronous location and exceeds the predetermined bit area, it can be estimated that the synchronization is lost or the actual skew quantity is larger than the allowable value of the assumed skew compensation quantity, therefore, the processing terminates with the code synchronization being uncompleted (S235).

On the other hand, when it is judged that no error correction occurs, it is decided that there is no error correction, that is, parity synchronization is successful, and the number of the success is counted up (S240). And it is judged whether the number of success exceeds a predetermined value (for example, five times) (S245). When the number of success is smaller than a predetermined value, the processing returns to S 205 and is repeated. When the number of success exceeds the predetermined value, it is judged that the code synchronization processing of the parity bit and deskew processing are completed (S250) and the processing returns to that of in FIG. 6.

Additionally, in S210, the judgment is made by whether the error correction occurred or not, however, it is allowable that by calculating the error rate, the judgment can be performed whether the error rate exceeds a predetermined value or not. For example, when the error rate is equal to or less than the predetermined value, it is judged that the parity synchronization is successful.

Next, in the above-mentioned error correction decoding processing (S105 in FIG. 7 or S205 in FIG. 8), procedures when the error correction occurs in each data link will be illustrated by using the flow chart of FIG. 9.

When an error correction occurs in one of the data links Dx (x is a natural number) out of data links D1-Dn (S300), processing starts. Firstly, in the comparison unit 240-x, the data stream of data link Dx and the data stream output from the parity decoding unit 225-x are compared, and as a result of the comparison, it is judged whether there is any difference between the data link and the parity or not (S305). If it is judged that there is a difference, it is when a bit error beyond assumption (equal to or more than two bits) occurs in the error correction code block of the data link Dx, and the corresponding code block is marked as an "error block" (S310), being moved to S315, and being configured to output the data corrected by the parity. When it is judged that there is no difference, the processing goes to S315 without change.

In S315, a BER (Bit Error Rate) of self link, that is, data link Dx is calculated. The BER is calculated from the number of error corrections occurred in unit time. Next, it is judged whether the BER exceeds a predetermined upper limit or not (S320). If it is judged that the BER is smaller than the upper limit, the processing returns to the normal state (S325). On the other hand, when it is judged that the BER exceeds the upper limit, that is, the reliability of the self link is lowered, at first, it is judged that no fault (for example, the occurrence of the error correction, increase of the BER, fault notice of the line, and the like) occurs in the data link except the data link Dx (S330). When a fault also occurs in other than the data link Dx, that is, a link fault occurs in two or more links, the error correction of the data is extremely hard to perform, and so because communications in the transmitting line cannot be maintained, the processing terminates by notifying the line disturbance (S335).

On the other hand, when it is judged that no error occurs in other data links, the selector 230-x is switched from the output of the error correction decoding unit 220-x to that of the parity decoding unit 225-x (S340). Next, the occurrence of the link fault in the data link Dx is notified (S345) and the processing terminates as a link fault state, returning to the flow chart of FIG. 7 or 8.

According to the above processing of FIG. 9, when there is a difference between the data link and the parity, the bit error rate (BER) is calculated, and when the BER exceeds a predetermined upper limit, the data link can be switched to the data, which is corrected by the parity. Additionally in S320, it is allowable to configure that not by comparing the BER with the predetermined upper limit, but by monitoring the transition of the BER, and when the BER abruptly increases, the process branches to S330 and up, being switched to the output from the parity.

According to the embodiment of this invention configured above, as for the original data, which is transmitted from the transmitting equipment 1, the parity of the original data is calculated, and furthermore, the error check bit of the original data and the parity data is calculated, and by transmitting all these along with the original data, the bit error generated in the transmission line can be corrected at the receiving side and the reliability of the transmission line can be enhanced.

Moreover, by transmitting the parity data and monitoring the bit error rate (BER) of the data of each link, when the reliability of the link is lowered, it is possible to switch from the received original data independent from the self data and the parity data to the retrieved data, so that even if one link is lost out of a plurality of the links comprising the line, the line will not immediately be broken and the data communication can be continued.

Further, the transmitting equipment 1 only transmits the data link, parity link and check link, and when an error occurs, the link can be switched only by the operation of the receiving equipment 2, so that no special operation is required for the transmitting equipment 1.

As mentioned above, the advantage of this invention is that by calculating the error check bit of the original data transmitted from the transmitting side, and transmitting with the original data, the bit error created in the transmission line can be corrected at the receiving side, so that the reliability of the transmission line is enhanced. Further, there is another advantage that by transmitting the parity data of the original data through a different link from the original data, it is possible to discard the unreliable link to switch from the received original data independent from the self link and the parity data to the retrieved data, so that even if one link is lost out of a plurality of the links comprising the line, the line will not immediately be broken.

What is claimed is:

1. A data transmission method for transmitting data through a transmission line that is integrated with a plurality of links including a first link group, a second link group, and a third link group, the method comprising:

transmitting information data through the first link group that comprises at least one link included in the plurality of links;

transmitting parity data generated from the information data through the second link group that comprises at least one link included in the plurality of links that is different from the first link group;

transmitting error check data generated from the information data and the parity data, which is used for an the error correction when an error occurs in the information data or the parity data, through the third link group that comprises at least one link included in the plurality of links that is different from the first link group and the second link group; and transmitting only the parity data through the second link group, and transmitting only the error check data through the third link group, wherein the first link group, the second link group, and the third link group are not the same.

2. The method according to claim 1, further comprising:

compensating a difference of arrival time between at least two among the information data, the parity data and the error check data, when the difference of arrival time occurs; and establishing a synchronization of the information data, the parity data and the error check data.

3. The method according to claim 2, further comprising:

compensating, when the error correction of the information data or the parity data is performed by using the error check data, the difference of arrival time of the information data, the parity data and the error check data to detect the difference of arrival time, in which the error correction does not continuously occur; and establishing a synchronization of the information data, the parity data and the error check data, using the detected difference of arrival time.

4. The method according to claim 1, further comprising:

judging whether the lost of information data occurs in at least one link included in the first link group, based on the result of comparison of the information data and the parity data;

calculating an error rate from the data transmitted by the first link group, the data transmitted by the second link group, and the error check data transmitted by the third link group; and replacing, when a loss of the information data occurs, the lost information data with the information data reproduced from the parity data, based on the result of a comparison of the error rate and a predetermined value.

5. The method according to claim 1, further comprising:

calculating an error ratio and an error ratio variation per unit time from the data transmitted by the first link group, the data transmitted by the second link group and the error check data transmitted by the third link group; and replacing the data transmitted by the first link group with the information data reproduced from the parity data when the error rate variation per unit time abruptly increases beyond a predetermined value.

6. The method according to claim 1, further comprising:

generating the information data from a plurality of parallel signals that are composed of a bit string including a plurality of bits;

generating the parity data from a signal that is composed of a parity calculated from the bit string;

generating the error check data from at least one check signal that is composed of a check bit string generated by using an error correction code obtained from the bit string and the parity;

transforming the generated information data, the generated parity data and the generated error check data into a plurality of serial signals;

transmitting each of the plurality of serial signals through the first link group the second link group and the third link group;

receiving the transmitted plurality of serial signals;

converting the received plurality of serial signals into information data, the parity data and the error check data;

detecting the error of the information data and the parity data by using the check bit string included in the error check data; and correcting the error of the information data by using the check bit string when an error is detected in the information data, and correcting the error of the parity data by using the check bit string when an error is detected in the parity data.

* * * * *